United States Patent
Bilancio et al.

(10) Patent No.: US 10,036,115 B2
(45) Date of Patent: Jul. 31, 2018

(54) METHOD OF DISPLAY FOR A LAUNDRY TREATING APPLIANCE

(71) Applicant: Whirlpool Corporation, Benton Harbor, MI (US)

(72) Inventors: Nathan L. Bilancio, Saint Joseph, MI (US); Jae Y. Kim, Stevensville, MI (US); Brandon L. Satanek, Stevensville, MI (US); Jaymeson M. Tucker, Minneapolis, MN (US)

(73) Assignee: Whirlpool Corporation, Benton Harbor, MI (US)

( * ) Notice: Subject to any disclaimer, the term of this patent is extended or adjusted under 35 U.S.C. 154(b) by 297 days.

(21) Appl. No.: 14/803,220

(22) Filed: Jul. 20, 2015

(65) Prior Publication Data
US 2017/0022651 A1  Jan. 26, 2017

(51) Int. Cl.
*G06F 3/0484* (2013.01)
*G06F 3/0488* (2013.01)
*G06F 1/16* (2006.01)
*G11B 19/02* (2006.01)
*H04N 1/00* (2006.01)
*D06F 39/00* (2006.01)
*D06F 33/02* (2006.01)

(52) U.S. Cl.
CPC ........ *D06F 39/005* (2013.01); *G06F 3/04847* (2013.01); *D06F 33/02* (2013.01); *D06F 2202/02* (2013.01); *D06F 2202/04* (2013.01); *D06F 2202/06* (2013.01); *D06F 2202/10* (2013.01); *D06F 2204/02* (2013.01); *D06F 2204/04* (2013.01); *D06F 2204/06* (2013.01); *D06F 2204/065* (2013.01); *D06F 2216/00* (2013.01); *G06F 1/1692* (2013.01); *G06F 3/04886* (2013.01); *G11B 19/025* (2013.01); *H04N 1/00435* (2013.01); *H04N 1/00437* (2013.01); *H04N 1/00501* (2013.01)

(58) Field of Classification Search
CPC ............ G06F 3/04847; G06F 3/04886; G06F 1/1692; G11B 19/025; H04N 1/00435; H04N 1/00437; H04N 1/00501; D06F 39/005; D06F 2202/02; D06F 2202/04; D06F 2202/06; D06F 2202/10; D06F 2204/02; D06F 2204/04; D06F 2204/065
See application file for complete search history.

(56) References Cited

U.S. PATENT DOCUMENTS 6,446,291 B1  9/2002 Diaz Fernandez et al.
6,935,142 B2  8/2005 Musser et al.
(Continued)

FOREIGN PATENT DOCUMENTS

GB  2008286 B  3/1982

OTHER PUBLICATIONS

Speed Queen, AWN542 Speedqueen.com: Home Laundry Speed Queen commercial and home laundry equipment coin operated laundromat washers, tumble dryers and extractors Nov. 24, 2014 https://web.archive.org/web/20110521064254/http://www.speedqueen.com/home/enus/products/product.aspx?id=346.

*Primary Examiner* — Eric J Bycer (57) ABSTRACT

A method of displaying selection information on a display of a user interface for a laundry treating appliance, including displaying on the display user-selectable options for laundry type and treatment type, in response to receiving user selections for the laundry type and treatment type, displaying on the display a group of user-selectable presets.

20 Claims, 6 Drawing Sheets

(56) References Cited

U.S. PATENT DOCUMENTS

| | | | |
|---|---|---|---|
| 8,196,441 B2 | 6/2012 | Hendrickson et al. | |
| 8,388,695 B2 | 3/2013 | Hendrickson et al. | |
| 8,397,328 B2 | 3/2013 | Hendrickson et al. | |
| 8,397,544 B2 | 3/2013 | Hendrickson | |
| 8,438,881 B2 | 5/2013 | Ihne et al. | |
| 8,813,526 B2 | 8/2014 | Doyle et al. | |
| 2002/0078511 A1* | 6/2002 | Blair | D06F 39/005 8/159 |
| 2003/0154560 A1* | 8/2003 | Behrens | D06F 39/005 8/159 |
| 2006/0220899 A1* | 10/2006 | Schult | G09F 9/33 340/815.45 |
| 2008/0127999 A1* | 6/2008 | Joerger | D06F 39/005 134/18 |
| 2008/0276382 A1* | 11/2008 | Benne | D06F 39/005 8/158 |
| 2012/0017457 A1* | 1/2012 | Bae | D06F 58/203 34/90 |
| 2013/0290902 A1* | 10/2013 | Martin | D06F 39/005 715/823 |
| 2014/0058553 A1* | 2/2014 | Lee | D06F 39/005 700/143 |
| 2015/0345068 A1* | 12/2015 | Coffman | D06F 58/28 715/771 |

* cited by examiner

METHOD OF DISPLAY FOR A LAUNDRY TREATING APPLIANCE

BACKGROUND

Laundry treating appliances, such as clothes washers and dryers can include a treating chamber in which laundry items are placed for treating. The laundry treating appliance can have a controller that implements a number of cycles of operation. Hot water, cold water, or a mixture thereof along with various treating chemistries can be supplied to the treating chamber in accordance with the cycle of operation. Various components of the laundry treating appliance can be operated differently based on the cycle of operation being implemented.

BRIEF DESCRIPTION OF THE INVENTION

In one aspect, an embodiment of the invention relates to a method of displaying selection information on a display of a user interface for a laundry treating appliance, including displaying on the display user-selectable options for laundry type and treatment type, in response to receiving user selections for the laundry type and treatment type, displaying on the display a group of user-selectable presets for at least one variable for the combination of the selected laundry type and treatment type, and in response to receiving at least one user selection from the group of user-selectable presets, executing a treating cycle defined according to the user-selected laundry type, treatment type, and variable.

DESCRIPTION OF EMBODIMENTS OF THE INVENTION

Contemporary laundry treating appliances only allow a single selection of a cycle. Such single cycle selections are limited in terms of both the number of selections and matching the desires of the customers. Embodiments of the invention allow a user to pick a laundry type and treatment type as well as variables related to the laundry type and treatment type. In this manner, the user interface allows users to select for implementation treating cycles that more closely match the physical garments they are loading into the machines as well as how those loaded garments will be treated.

Figure 1:
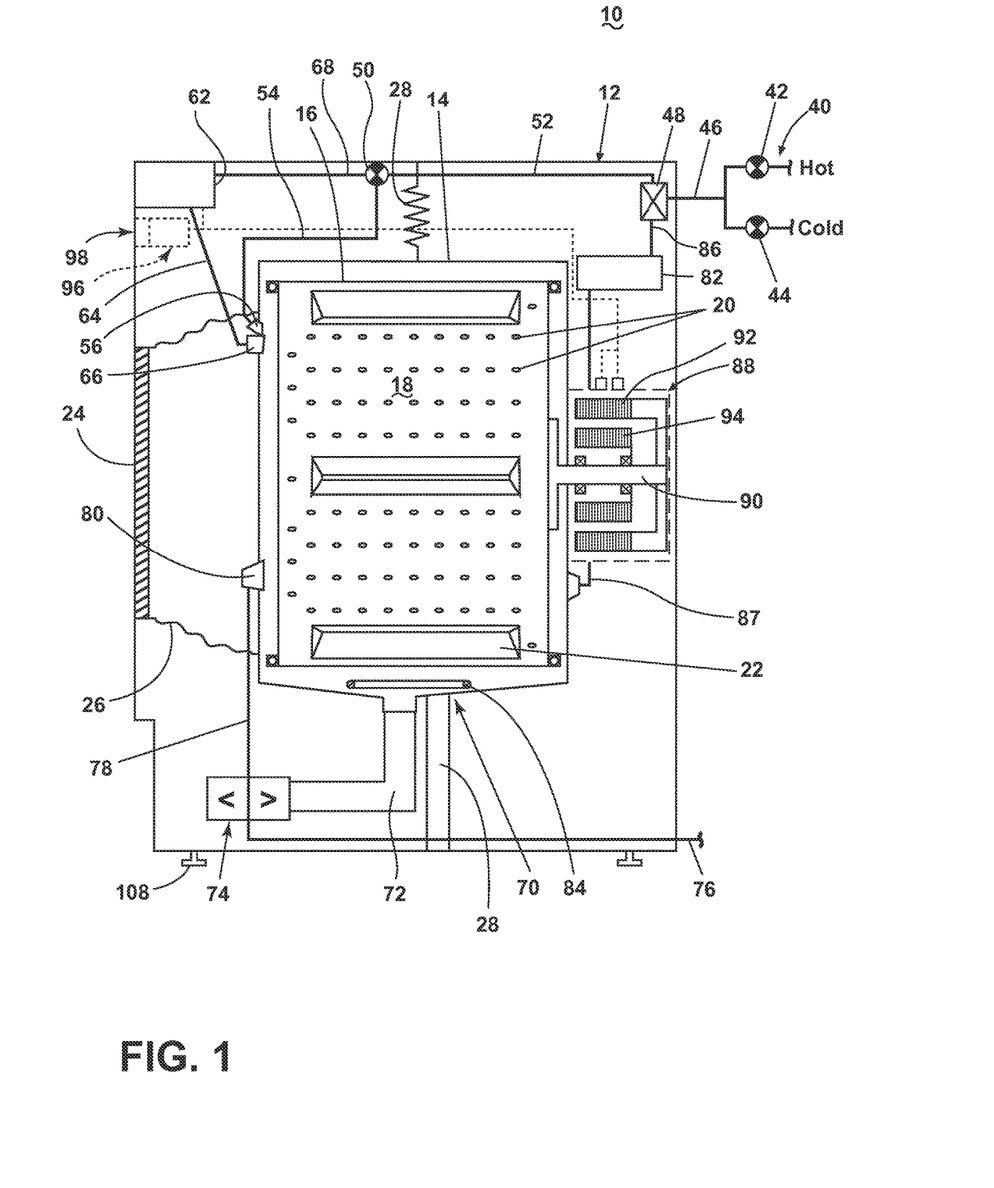
FIG. 1 is a schematic view of a household appliance in the form of a washing machine.

FIG. 1 is a schematic view of a household appliance in the form of a laundry treating appliance according to a first embodiment of the invention. The laundry treating appliance can be any appliance having a treating chamber for receiving at least one item for treatment according to the cycle of operation and performs a cycle of operation to clean or otherwise treat items placed therein, non-limiting examples of which include a horizontal or vertical axis clothes washer; a combination washing machine and dryer; a dispensing dryer; a tumbling or stationary refreshing/revitalizing machine; an extractor; a non-aqueous washing apparatus; and a revitalizing machine.

The laundry treating appliance of FIG. 1 is illustrated as a washing machine 10, which can include a structural support system comprising a cabinet 12 which defines a housing within which a laundry holding system resides. The cabinet 12 can be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a drum 16 provided within the tub 14, the drum 16 defining at least a portion of a laundry treating chamber 18. The drum 16 can include a plurality of perforations 20 such that liquid can flow between the tub 14 and the drum 16 through the perforations 20. A plurality of baffles 22 can be disposed on an inner surface of the drum 16 to lift the laundry load received in the treating chamber 18 while the drum 16 rotates. It is also within the scope of the invention for the laundry holding system to comprise only a tub with the tub defining the laundry treating chamber.

The laundry holding system can further include a door 24 which can be movably mounted to the cabinet 12 to selectively close both the tub 14 and the drum 16. A bellows 26 can couple an open face of the tub 14 with the cabinet 12, with the door 24 sealing against the bellows 26 when the door 24 closes the tub 14.

The washing machine 10 can further include a suspension system 28 for dynamically suspending the laundry holding system within the structural support system.

The washing machine 10 can further include a liquid supply system for supplying water to the washing machine 10 for use in treating laundry during a cycle of operation. The liquid supply system can include a source of water, such as a household water supply 40, which can include separate valves 42 and 44 for controlling the flow of hot and cold water, respectively. Water can be supplied through an inlet conduit 46 directly to the tub 14 by controlling first and second diverter mechanisms 48 and 50, respectively. The diverter mechanisms 48, 50 can be a diverter valve having two outlets such that the diverter mechanisms 48, 50 can selectively direct a flow of liquid to one or both of two flow paths. Water from the household water supply 40 can flow through the inlet conduit 46 to the first diverter mechanism 48 which can direct the flow of liquid to a supply conduit 52. The second diverter mechanism 50 on the supply conduit 52 can direct the flow of liquid to a tub outlet conduit 54 which can be provided with a spray nozzle 56 configured to spray the flow of liquid into the tub 14. In this manner, water from the household water supply 40 can be supplied directly to the tub 14.

The washing machine 10 can also be provided with a dispensing system for dispensing treating chemistry to the treating chamber 18 for use in treating the laundry according to a cycle of operation. The dispensing system can include a treating chemistry dispenser 62 which can be a single use dispenser or a combination of a single use dispenser and a bulk dispenser. Non-limiting examples of suitable dispensers are disclosed in U.S. Pub. No. 2010/0000022 to Hendrickson et al., filed Jul. 1, 2008, now U.S. Pat. No. 8,196,441, issued Jun. 12, 2012, entitled "Household Cleaning Appliance with a Dispensing System Operable Between a Single Use Dispensing System and a Bulk Dispensing System," U.S. Pub. No. 2010/0000024 to Hendrickson et al., filed Jul. 1, 2008, now U.S. Pat. No. 8,388,695, issued Mar. 5, 2013, entitled "Apparatus and Method for Controlling Laundering Cycle by Sensing Wash Aid Concentration," U.S. Pub. No. 2010/0000573 to Hendrickson et al., filed Jul. 1, 2008, now U.S. Pat. No. 8,397,328, issued Mar. 19, 2013, entitled "Apparatus and Method for Controlling Concentration of Wash Aid in Wash Liquid," U.S. Pub. No. 2010/0000581 to Doyle et al., filed Jul. 1, 2008, now U.S. Pat. No. 8,813,526, issued Aug. 26, 2014, entitled "Water Flow Paths in a Household Cleaning Appliance with Single Use and Bulk Dispensing," U.S. Pub. No. 2010/0000586 to Hendrickson, filed Jun. 23, 2009, now U.S. Pat. No. 8,397,544, issued Mar. 19, 2013, entitled "Household Cleaning Appliance with a Single Water Flow Path for Both Non-Bulk and Bulk Dispensing," and application Ser. No. 13/093,132, filed Apr. 25, 2011, now U.S. Pat. No. 8,438,881, issued May 14, 2013, entitled "Method and Apparatus for Dispensing Treating Chemistry in a Laundry Treating Appliance," which are herein incorporated by reference in full.

The treating chemistry dispenser 62 can dispense a treating chemistry directly to the tub 14 or the treating chamber 18 or can be mixed with water from the liquid supply system through a dispensing outlet conduit 64. The dispensing outlet conduit 64 can include a dispensing nozzle 66 configured to dispense the treating chemistry into the tub 14 in a desired pattern and under a desired amount of pressure. For example, the dispensing nozzle 66 can be configured to dispense a flow or stream of treating chemistry into the tub 14 by gravity, i.e. a non-pressurized stream. Water can be supplied to the treating chemistry dispenser 62 from the supply conduit 52 by directing the diverter mechanism 50 to direct the flow of water to a dispensing supply conduit 68.

The washing machine 10 can also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can direct liquid to a drain conduit 76, which can drain the liquid from the washing machine 10, or to a recirculation conduit 78, which can terminate at a recirculation inlet 80. The recirculation inlet 80 can direct the liquid from the recirculation conduit 78 into the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry can be recirculated into the treating chamber 18 for treating the laundry within.

The liquid supply and/or recirculation and drain system can be provided with a heating system which can include one or more devices for heating laundry and/or liquid supplied to the tub 14, such as a steam generator 82 and/or a sump heater 84. Liquid from the household water supply 40 can be provided to the steam generator 82 through the inlet conduit 46 by controlling the first diverter mechanism 48 to direct the flow of liquid to a steam supply conduit 86. Steam generated by the steam generator 82 can be supplied to the tub 14 through a steam outlet conduit 87. The steam generator 82 can be any suitable type of steam generator such as a flow through steam generator or a tank-type steam generator. Alternatively, the sump heater 84 can be used to generate steam in place of or in addition to the steam generator 82. In addition or alternatively to generating steam, the steam generator 82 and/or sump heater 84 can be used to heat the laundry and/or liquid within the tub 14 as part of a cycle of operation.

Additionally, the liquid supply and recirculation and drain system can differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system can include a motor 88, which can be directly coupled with the drum 16 through a drive shaft 90 to rotate the drum 16 about a rotational axis during a cycle of operation. The motor 88 can be a brushless permanent magnet (BPM) motor having a stator 92 and a rotor 94. Alternately, the motor 88 can be coupled to the drum 16 through a belt and a drive shaft to rotate the drum 16, as is known in the art. Other motors, such as an induction motor or a permanent split capacitor (PSC) motor, can also be used. The motor 88 can rotate the drum 16 at various speeds in either rotational direction.

The washing machine 10 also includes a control system for controlling the operation of the washing machine 10 to implement one or more cycles of operation. The control system can include a controller 96 located within the cabinet 12 and a user interface 98 that is operably coupled with the controller 96. The user interface 98 can include one or more knobs, dials, switches, displays, touch screens, and the like for communicating with the user, such as to receive input and provide output. The user can enter different types of information including, without limitation, laundry type, treatment type, cycle options, user-selectable presets, etc.

The controller 96 can include the machine controller and any additional controllers provided for controlling any of the components of the washing machine 10. For example, the controller 96 can include the machine controller and a motor controller. Many known types of controllers can be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
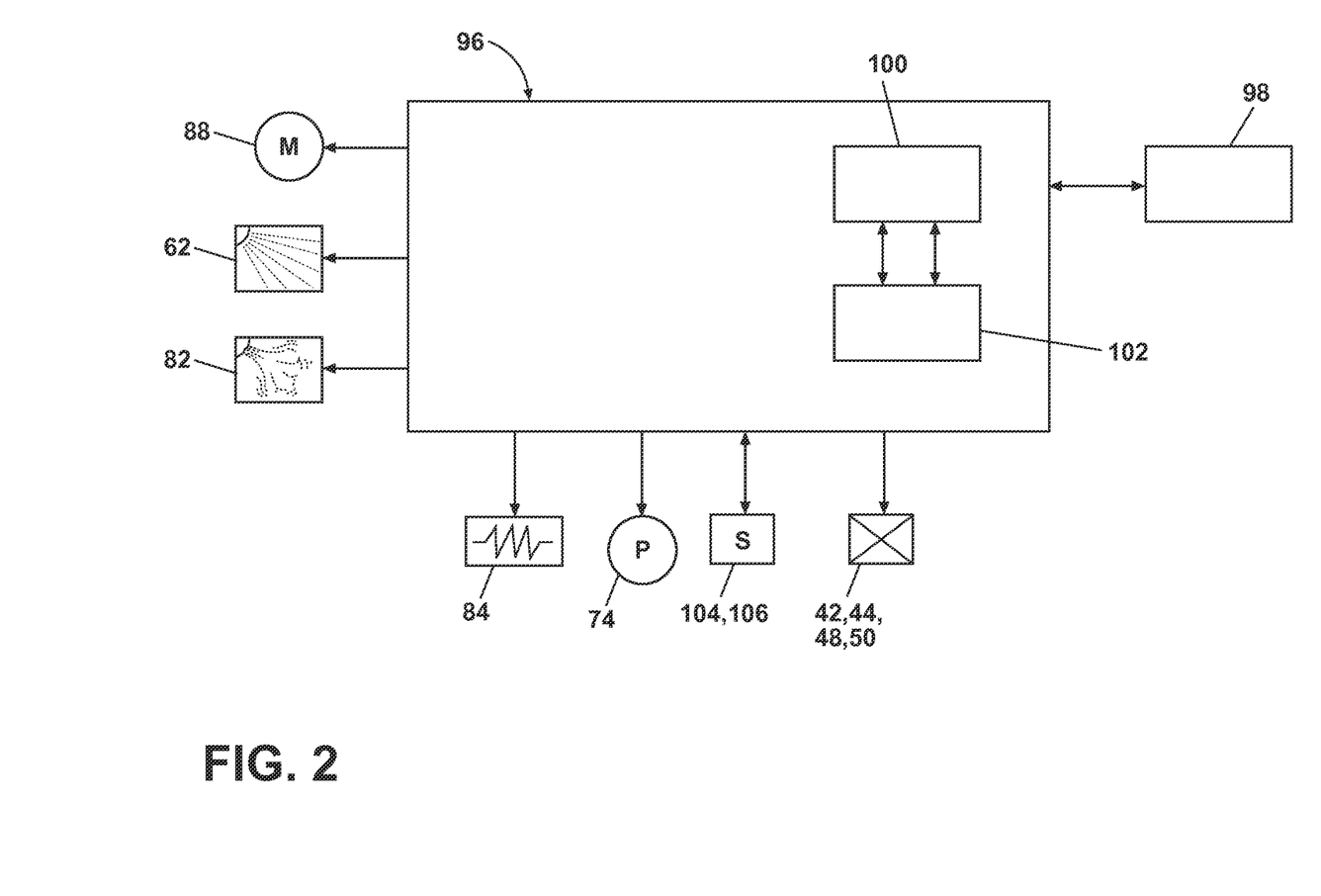
FIG. 2 is a schematic of a control system of the household appliance of FIG. 1.

As illustrated in FIG. 2, the controller 96 can be provided with a memory 100 and a central processing unit (CPU) 102. The memory 100 can be used for storing the control software that is executed by the CPU 102 in completing a cycle of operation using the washing machine 10 and any additional software. The memory 100 can also be used to store information, such as a database or table, and to store data received from one or more components of the washing machine 10 that can be communicably coupled with the controller 96. The database or table can be used to store the various operating parameters for the one or more cycles of operation, including factory default values for the operating parameters and any adjustments to them by the control system or by user input.

The controller 96 can be operably coupled with one or more components of the washing machine 10 for communicating with and controlling the operation of the component to complete a cycle of operation. For example, the controller 96 can be operably coupled with the motor 88, the pump 74, the treating chemistry dispenser 62, the steam generator 82 and the sump heater 84 to control the operation of these and other components to implement one or more of the cycles of operation.

The controller 96 can also be coupled with one or more sensors 104 provided in one or more of the systems of the washing machine 10 to receive input from the sensors, which are known in the art and not shown for simplicity. Non-limiting examples of sensors 104 that can be communicably coupled with the controller 96 include: a treating chamber temperature sensor, a moisture sensor, a weight sensor, a chemical sensor, a position sensor and a motor torque sensor, which can be used to determine a variety of system and laundry characteristics, such as laundry load inertia or mass.

In one example, one or more load amount sensors 106 can also be included in the washing machine 10 and can be positioned in any suitable location for detecting the amount of laundry, either quantitative (inertia, mass, weight, etc.) or qualitative (small, medium, large, etc.) within the treating chamber 18. By way of non-limiting example, it is contemplated that the amount of laundry in the treating chamber can be determined based on the weight of the laundry and/or the volume of laundry in the treating chamber. Thus, the one or more load amount sensors 106 can output a signal indicative of either the weight of the laundry load in the treating chamber 18 or the volume of the laundry load in the treating chamber 18.

The one or more load amount sensors 106 can be any suitable type of sensor capable of measuring the weight or volume of laundry in the treating chamber 18. Non-limiting examples of load amount sensors 106 for measuring the weight of the laundry can include load volume, pressure, or force transducers which can include, for example, load cells and strain gauges. It has been contemplated that the one or more such sensors 106 can be operably coupled to the suspension system 28 to sense the weight borne by the suspension system 28. The weight borne by the suspension system 28 correlates to the weight of the laundry loaded into the treating chamber 18 such that the sensor 106 can indicate the weight of the laundry loaded in the treating chamber 18. In the case of a suitable sensor 106 for determining volume it is contemplated that an IR or optical based sensor can be used to determine the volume of laundry located in the treating chamber 18.

Alternatively, it has been contemplated that the washing machine 10 can have one or more pairs of feet 108 extending from the cabinet 12 and supporting the cabinet 12 on the floor and that a weight sensor (not shown) can be operably coupled to at least one of the feet 108 to sense the weight borne by that foot 108, which correlates to the weight of the laundry loaded into the treating chamber 18. In another example, the amount of laundry within the treating chamber 18 can be determined based on motor sensor output, such as output from a motor torque sensor. The motor torque is a function of the inertia of the rotating drum and laundry. There are many known methods for determining the load inertia, and thus the load mass, based on the motor torque. It will be understood that the details of the load amount sensors are not germane to the embodiments of the invention and that any suitable method and sensors can be used to determine the amount of laundry.

Figure 3:
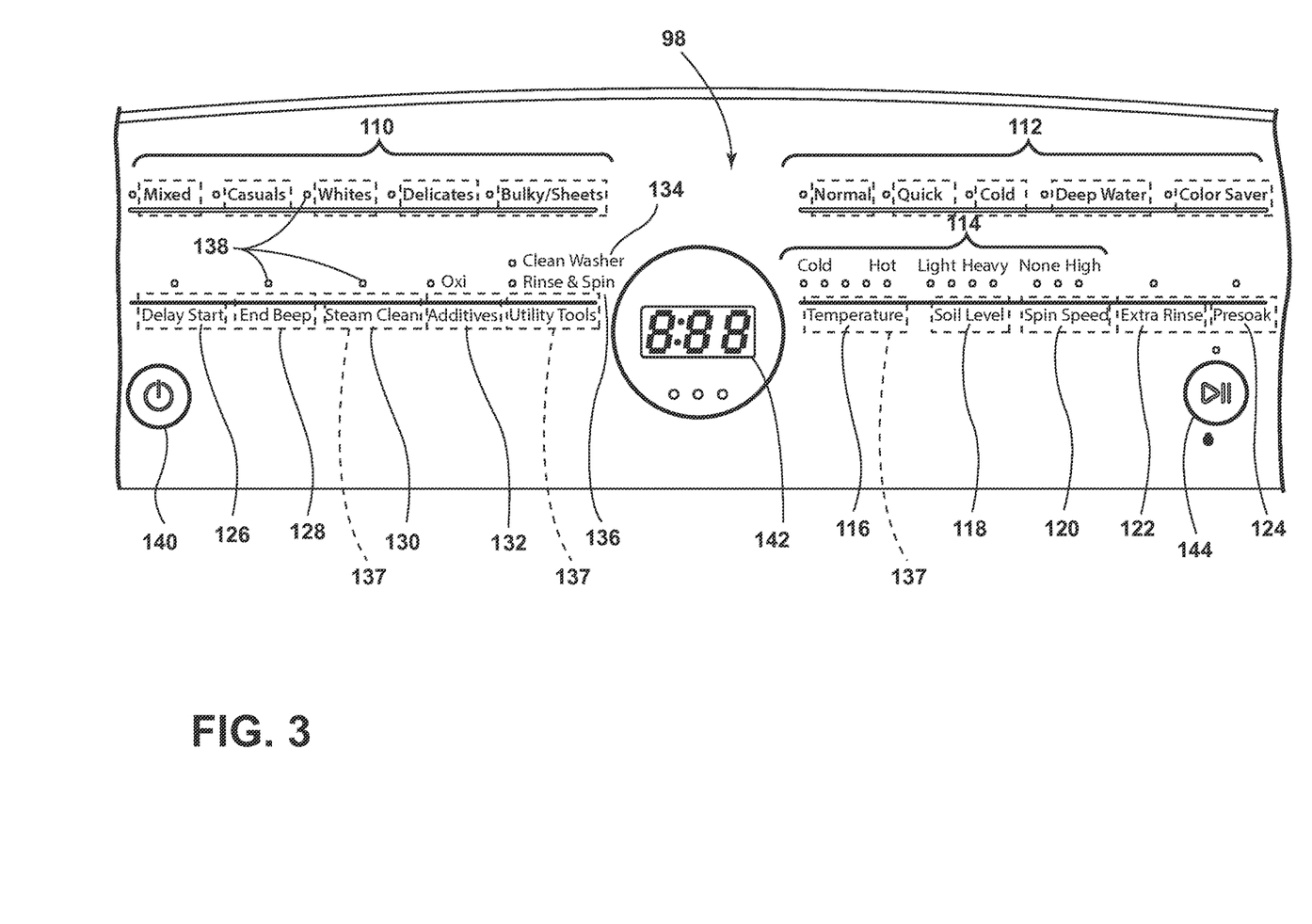
FIG. 3 is a front view of an exemplary user interface that can be included in the household appliance of FIG. 1.

An example of a user interface 98 that can be utilized in the washing machine 10 is illustrated in FIG. 3. User-selectable options for laundry type are displayed at 110 and user-selectable options for treatment type are displayed at 112. Examples, without limitation, of laundry types that can be displayed are mixed, casuals, whites, delicates, bulky/sheets, etc. Examples, without limitation, of treatment type include: normal wash, quick wash, cold wash, deep water, color saver, etc.

The treatment types 112 for each user-selectable laundry type 110 can include at least one user-selectable variable. Several user-selectable variables are displayed at 114. The user-selectable variables 114 have been illustrated as including, but are not limited to, temperature 116, soil level 118, and spin speed 120. The options available for the temperature 116 can be a range including, but not limited to, from cold to hot. The options available for the soil level 118 can be a range including, but not limited to, from light to heavy. The options available for the spin speed 120 can also be a range including, but not limited to, from none to high.

Further still, additional options such as extra rinse 122, presoak 124, delayed start 126, steam clean 130, additives 132, etc. can be included on the user interface 98. Such options need not be preset user-selectable variable 114 that are specific to a laundry type 110 and treatment type 112 and thus have not been illustrated as being encompassed by the bracket defining the preset user-selectable variables 114. However, it will be understood that one or more can be a user-selectable variable 114 that is preset depending on the laundry type 110 and treatment type 112. For sake of clarity such options will be described in the remainder of the description as being not included as preset user-selectable variables 114. Further, functions like end beep 128, clean washer 134 and rinse and spin 136, which are not specific to a laundry type 110 and treatment type 112 can also be included on the user interface 98.

The user-selectable laundry types 110, user-selectable treatment types 112, and user-selectable variables 114, options, etc. can each be selected by depressing a switch or button 137 associated with that selection. The button 137 for each has been illustrated with phantom lines for clarity. Depressing the corresponding button 137 for a feature having multiple options can enable a user to scroll through the available options and select a preferred option.

Each of the user-selectable laundry types 110, user-selectable treatment types 112, user-selectable variables 114, options, etc. has also been illustrated as including an associated illumination source 138, that can be illuminated when the corresponding user-selectable laundry type 110, user-selectable treatment type 112, user-selectable variable 114, option, etc. has been selected.

The user interface 98 can also include operational inputs including, but not limited to, a power button 140, start/pause button 144, etc. These related operational inputs can be used to effect the progress of the laundry washing treating cycle. Further still, a visual display 142 can be included to convey information to the user. While the visual display 142 has been illustrated as an alpha-numeric display it can be any type of visual display including an LED, LCD, OLED, type display, etc. Any or all of these features can be marked with appropriate indicia to indicate their function. While the user-selectable options for laundry type 110 and treatment type 112, user-selectable variables 114, options, etc. have been illustrated on the user interface 98 as being fixed it is contemplated that they can alternatively be dynamically displayed on the visual display 142 or another display having corresponding selectable buttons.

Figure 4:
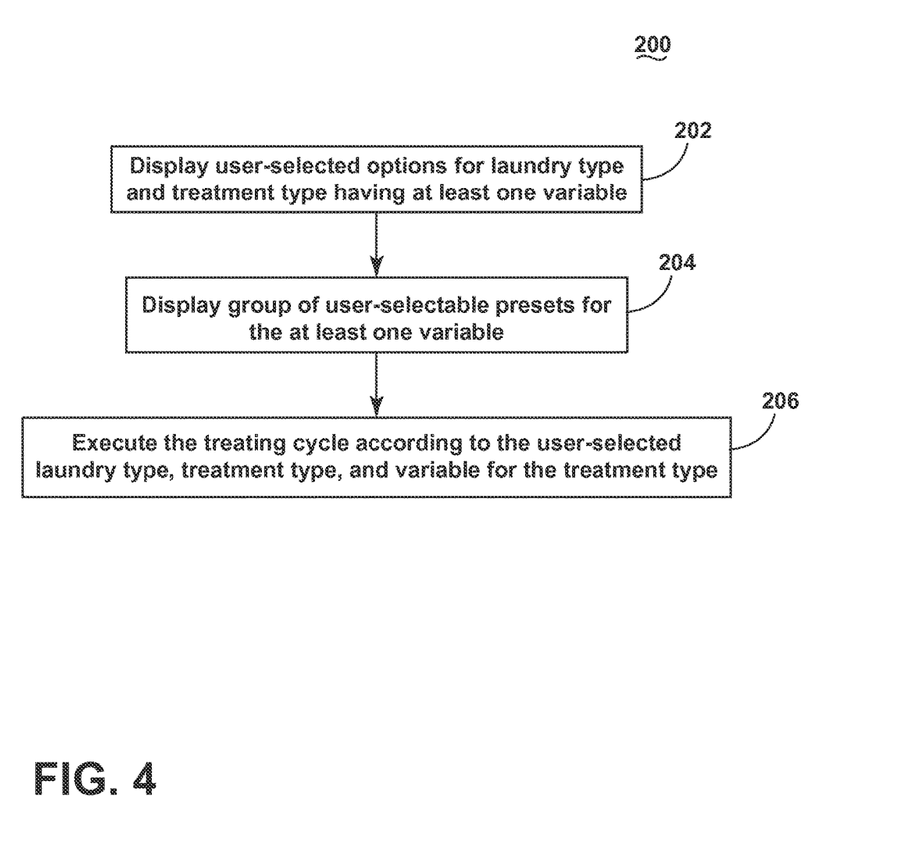
FIG. 4 is a flow chart of a method for displaying treating cycle selection information according to an embodiment of the invention.

Selecting the cycle of operation or treating cycle requires a user to manipulate several of these features including at least a user-selectable laundry type 110, user-selectable treatment type 112, and user-selectable variable 114 to initiate operation and specify parameters of the treating cycle. In this manner it will be understood that the previously described washing machine 10 can be used to implement one or more embodiments of a method of the invention. Referring now to FIG. 4, a flow chart of a method 200 for displaying treating cycle selection information on a display of the user interface 98 is illustrated. The method 200 assumes that no user-selections have occurred prior to the start of the method 200, although the method can begin with already selected inputs, such as when the inputs from the prior cycle are "sticky" and are carried forward to the next cycle. The method 200 can be initiated automatically when the door 25 is opened, when the door 25 is closed, when the power button 140 is operated, etc.

The method 200 begins at 202 by displaying on the user interface 98 user-selectable options for laundry type 110 and treatment type 112. This can include displaying the laundry types 110 and treatment types 112 on a dynamic display or illuminating the associated illumination sources 138 to indicate to a user that the laundry types 110 and treatment types 112 are selectable. By way of non-limiting example, initially each of the laundry types 110 and treatment types 112 can be displayed or indicated as selectable by the illumination of the illumination sources 138 in one of several illumination states. For example, a user-selectable laundry type 110 or treatment type 112 that is available and not selected can be illuminated in a first illumination state, which can be a first color such as amber. Once a user has selected the desired laundry type 110 or treatment type 112, the corresponding illumination sources 138 for the laundry type 110 or treatment type 112 that is selected can be illuminated in a second illumination state, which can be a second color such as green. Once a user has selected the desired laundry type 110 or treatment type 112, the unselected laundry types 110 or treatment types 112 can be illuminated in a third illumination state, which can be a darkened or off state or a third color such as red. Alternatively, the unselected laundry types 110 and treatment types 112 can remain the first color (amber). Further, before the laundry type 110 and treatment type 112 are selected, the user-selectable variables 114, options, etc. can also be in a darkened or off state.

In response to receiving user selections for the laundry type 110 and treatment type 112, the washing machine 10 at 204 can display on the user interface 98 a group of user-selectable presets for the user-selectable variables 114. The presets can be displayed in a manner that indicates they are selected, for example they can be illuminated in the second illumination state, which can be a second color such as green. The user-selectable variables 114 that are not preset but are available can be illuminated in the first illumination state, which can be a first color such as amber. User-selectable variables 114 that are unavailable for the selected laundry type 110 and treatment type 112 can be illuminated in a third illumination state, which can be darkened or a third color such as red.

To accept the user-selectable presets the user can merely press the start button 144 to confirm the presets and being the treating cycle. It will be understood that pressing the start button 144 is considered a user selection from the group of user-selectable variables 114. Alternatively, the user can modify the user-selectable presets by utilizing the associated button 137 or alternative input sources. In response to receiving at least one user selection from the group of user-selectable presets, the washing machine 10 at 206 can execute a treating cycle defined according to the user-selected laundry type 110, treatment type 112, and variable 114. In this manner, it will be understood that the terms "treating cycle" or "cycle of operation" is based on the selected treatment type, laundry type, and selected associated variables.

More specifically, once the controller 96 receives the laundry type and treatment type the controller 96 can determine one or more user-selectable variables 114, that can be implemented or that are optimal or recommended for the combination of the laundry type and treatment type. The controller 96 can have a table of user-selectable variables 114 that can be selected for the various combinations of laundry type 110 and treatment type 112 stored in its memory 100. The controller 96 can determine that only these user-selectable variables 114 are selectable based on the selected combinations of laundry type and treatment type. Once it is determined what variables 114 are appropriate, the controller 96 can correspondingly activate the user interface 98 accordingly. Once the user selects the variables, the controller 96 can then have a table of treating cycles that can be selected for the selected combination of laundry type 110, treatment type 112, and variables 114.

It will be understood that the method 200 of displaying treating cycle selection information on a display is flexible and the method 200 illustrated is merely for illustrative purposes. For example, the sequence of steps depicted is for illustrative purposes only, and is not meant to limit the method 200 in any way, as it is understood that the steps can proceed in a different logical order or additional or intervening steps can be included without detracting from embodiments of the invention. By way of non-limiting example, it will be understood that additional options can also be displayed and selected by a user and can include, but are not limited to, extra rinse 122, presoak 124, delayed start 126, steam clean 130, additives 132, etc.

Further still, the controller 96 in executing the treating cycle at 206 can take into account the laundry type 110, treatment type 112, and variable selection 114 in determining how to execute the treating cycle. For example, a predetermined variable selection can have different values or operating characteristics for at least some of the combinations of fabric type and treatment type. By way of non-limiting example, while a cold to hot temperature range can be indicated on the user interface 98, the controller 96 for a specific laundry type 110 and treatment type 112 can take the user-selectable variable selection for the temperature 116 and implement the treating cycle within a specific temperature range based on the combination of the laundry type and treatment type. So, for a mixed laundry type 110 and a normal treatment type 112, if the hot selection is selected for the temperature variable 116, the operating temperature can be at a higher temperature than if the hot selection for the temperature variable 116 is selected for a mixed laundry type 110 and a cold treatment type 112. In this manner, the implementation of the treating cycle is based on the laundry type 110, treatment type 112, and variables 114; although the user-selectable variable 114 can be selected as being at the "same" variable level, the controller 96 implements the treating cycle such that it will have different water temperatures because of the combination of the laundry type 110 and treatment type 112 that the variable 114 was selected for.

It is contemplated that displaying the group of user-selectable presets can also include displaying default settings or a combination of default settings and previously selected user-selections, some or all of which can then be modified, selected, or unselected by a user at 204. The following illustrate user-selectable variable presets for several exemplary combinations. Again, such pre-sets can then be user selected through acceptance or can be user selected through choosing a different setting to customize the treating cycle according to user preference. In the following the numbers represents the feature levels, where 1 is equal to the lowest setting (i.e. the far left indicator would be selected). For the combination of a mixed laundry type 110 selection and a normal treatment type 112 selection the presets initially displayed could include, but are not limited to, a temperature 116 preset of three, a soil level 118 preset of three, and a spin speed 120 preset of three. Further, regardless of whether the following are considered user-selectable variables 114 or separate options, the steam clean 130 can be preset or defaulted to off, the additive selection 132 can be preset to off, the extra rinse 122 can be preset to off and the presoak 124 can be preset to off.

Conversely, for the combination of a casual laundry type 110 selection and a normal treatment type 112 selection of the presets initially displayed could include, but are not limited to, a temperature 116 preset of three, a soil level 118 preset of two, and a spin speed 120 preset of two. As with the previous example, the steam clean 130 can be preset or defaulted to off, the additive selection 132 can be preset to off, the extra rinse 122 can be preset to off, and the presoak 124 can be preset to off. As still yet another example, for the combination of a whites laundry type 110 selection and a normal treatment type 112 selection the presets initially displayed could include, but are not limited to, a temperature 116 preset of five, a soil level 118 preset of four, and a spin speed 120 preset of three. Again, the steam clean 130 can be preset or defaulted to off, the additive selection 132 can be preset to off, the extra rinse 122 can be preset to off and the presoak 124 can be preset to off.

As still yet another example, for the combination of a delicates laundry type 110 selection and a quick treatment type 112 selection the presets initially displayed could include, but are not limited to, a temperature 116 preset of two, a soil level 118 preset of one, and a spin speed 120 preset of two. The steam clean 130 can be preset or defaulted to off, the additive selection 132 can be preset to off, the extra rinse 122 can be preset to off and the presoak 124 can be preset to off.

Further still, the selections made by a user for the user-selectable variables 114 for a particular combination of laundry type and treatment type can be retained in the memory 100 and can then be utilized as the preset variables and displayed at 204. Such remembered selections can then be modified, unselected, or retained for that specific treating cycle. The memory retention can include short term, where the selections are remembered as soon as they are selected and/or long term, where after pressing the Start button 140, the selections are remembered even after power loss or unplugging and plugging in of the power cable. By way of non-limiting examples selections that can be retained in the memory 100 include temperature, soil level, spin speed, and additives.

Figure 5:
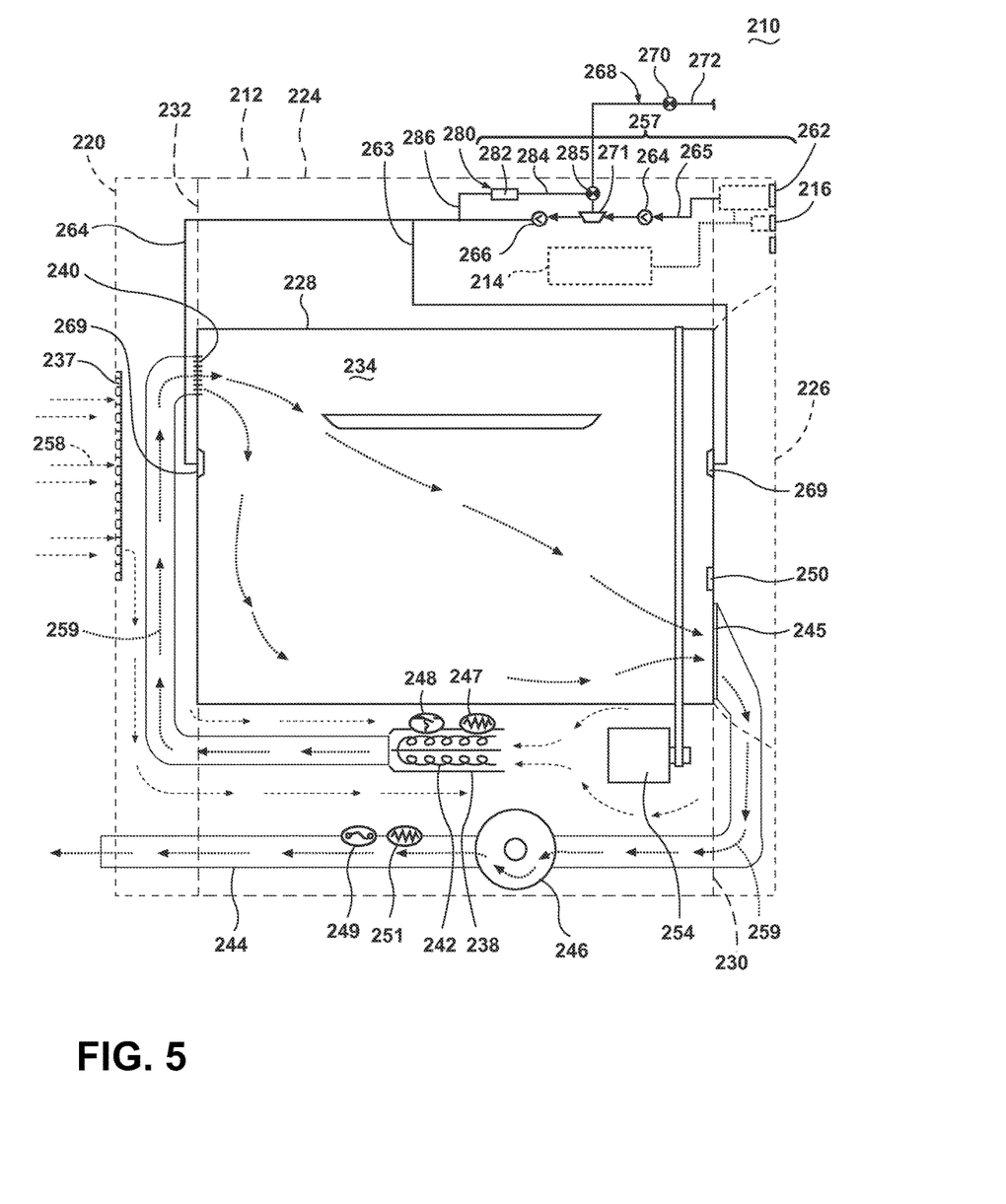
FIG. 5 is a schematic view of a household appliance in the form of a dispensing dryer.

Further, it will be understood that the above method of displaying treating cycle selection information on a display of a user interface can be employed in alternative laundry treating appliances. For example, FIG. 5 illustrates another household appliance in the form of a dispensing dryer 210 that can be controlled according to embodiments of the invention. The dispensing dryer 210 described herein shares many features of a traditional clothes dryer, which will not be described in detail except as necessary for a complete understanding of the invention. The dispensing dryer 210 can include a cabinet 212 in which is provided a controller 214 that can receive input from a user through a user interface 216 for selecting a cycle of operation and controlling the operation of the dispensing dryer 210 to implement the selected cycle of operation. The user interface 216 can include operational controls such as dials, lights, switches, and displays enabling a user to input commands, such as a cycle of operation, to the controller 214 and receive information such as an indication of the presence of a physically altered unit dose container.

A rotatable drum 228 can be disposed within the interior of the cabinet 212 between opposing stationary front and rear bulkheads 230, 232, which, along with the a door 226, collectively define a treating chamber in the form of a laundry drying chamber 234 for treating laundry. As illustrated, and as is the case with most clothes dryers, the treating chamber 234 is not fluidly coupled to a drain. Thus, any liquid introduced into the treating chamber 234 cannot be removed merely by draining. Non-limiting examples of laundry that can be treated according to a cycle of operation include, a hat, a scarf, a glove, a sweater, a blouse, a shirt, a pair of shorts, a dress, a sock, a pair of pants, a shoe, an undergarment, and a jacket. Furthermore, textile fabrics in other products, such as draperies, sheets, towels, pillows, and stuffed fabric articles (e.g., toys), can be treated in the clothes dryer 210. The drum 228 can be operably coupled with a motor 254 to selectively rotate the drum 228 during a cycle of operation.

An air system can be provided to the clothes dryer 210. The air system supplies air to the treating chamber 234 and exhausts air from the treating chamber 234. The supplied air can be heated or not. The air system can have an air supply portion that can form, in part, a supply conduit 238, which has one end open to ambient air via a rear vent 237 and another end fluidly coupled to an inlet grill 240, which can be in fluid communication with the treating chamber 234. A heating element 242 can lie within the supply conduit 238 and can be operably coupled to and controlled by the controller 214; if the heating element 242 is turned on, the supplied air will be heated prior to entering the drum 228. The air system can further include an air exhaust portion that can be formed in part by an exhaust conduit 244. A lint trap 245 can be provided as the inlet from the treating chamber 234 to the exhaust conduit 244. A blower 246 can be fluidly coupled to the controller 214. Operation of the blower 246 draws air into the treating chamber 234 as well as exhausts air from the treating chamber 234 through the exhaust conduit 244. The exhaust conduit 244 can be fluidly coupled with a household exhaust duct (not shown) for exhausting the air from the treating chamber 234 to the outside of the dispensing dryer 210.

The air system can further include various sensors and other components, such as a thermistor 247 and a thermostat 248, which can be used to aid in determining an inlet temperature. A thermistor 251 and a thermal fuse 249 can be coupled to the exhaust conduit 244, with the thermistor 251 being used to determine an outlet air temperature. A moisture sensor 250 can be positioned in the interior of the treating chamber 234 to monitor the amount of moisture of the laundry in the treating chamber 234.

A dispensing system 257 can be provided to dispense one or more treating chemistries to the treating chamber 234 according to a cycle of operation. The dispensing system 257 can be fluidly coupled to a water supply 268. The dispensing system 257 can be further coupled to the treating chamber 234 through one or more nozzles 269. As illustrated, the dispensing system 257 can include a treating chemistry dispenser 262, which can provide a supply of treating chemistry for dispensing into the treating chamber 234. As illustrated the treating chemistry dispenser 262 can be located in the interior of the cabinet 212 although other locations are also possible.

A mixing chamber 271 can be provided to couple the treating chemistry dispenser 262 to the treating chamber 234 through a supply conduit 265. Pumps such as a metering pump 264 and delivery pump 266 can be provided to the dispensing system 257 to selectively supply a treating chemistry and/or liquid to the treating chamber 234 according to a cycle of operation. The water supply 268 can be fluidly coupled to the mixing chamber 271 to provide water from the water source to the mixing chamber 271. The water supply 268 can include an inlet valve 270 and a water supply conduit 272. It is noted that, instead of water, a different treating chemistry can be provided from the exterior of the clothes dryer 210 to the mixing chamber 271.

The dryer 210 can also be provided with a steam generating system 280, which can be separate from the dispensing system 257 or integrated with portions of the dispensing system 257 for dispensing steam and/or liquid to the treating chamber 234 according to a cycle of operation. The steam generating system 280 can include a steam generator 282 fluidly coupled with the water supply 268 through a steam inlet conduit 284. A fluid control valve 285 can be used to control the flow of water from the water supply conduit 272 between the steam generating system 280 and the dispensing system 257. The steam generator 282 can further be fluidly coupled with the one or more supply conduits 265 through a steam supply conduit 286 to deliver steam to the treating chamber 234 through the nozzles 269. Alternatively, the steam generator 282 can be coupled with the treating chamber 234 through one or more conduits and nozzles independently of the dispensing system 257. The steam generator 282 can be any type of device that converts the supplied liquid to steam. It will be understood that the details of the steam generating system 280 are not germane to the embodiment of the invention and that any suitable steam generating system can be used with the dryer 210. It is also within the scope of the invention for the dryer 210 to not include a steam generating system.

Figure 6:
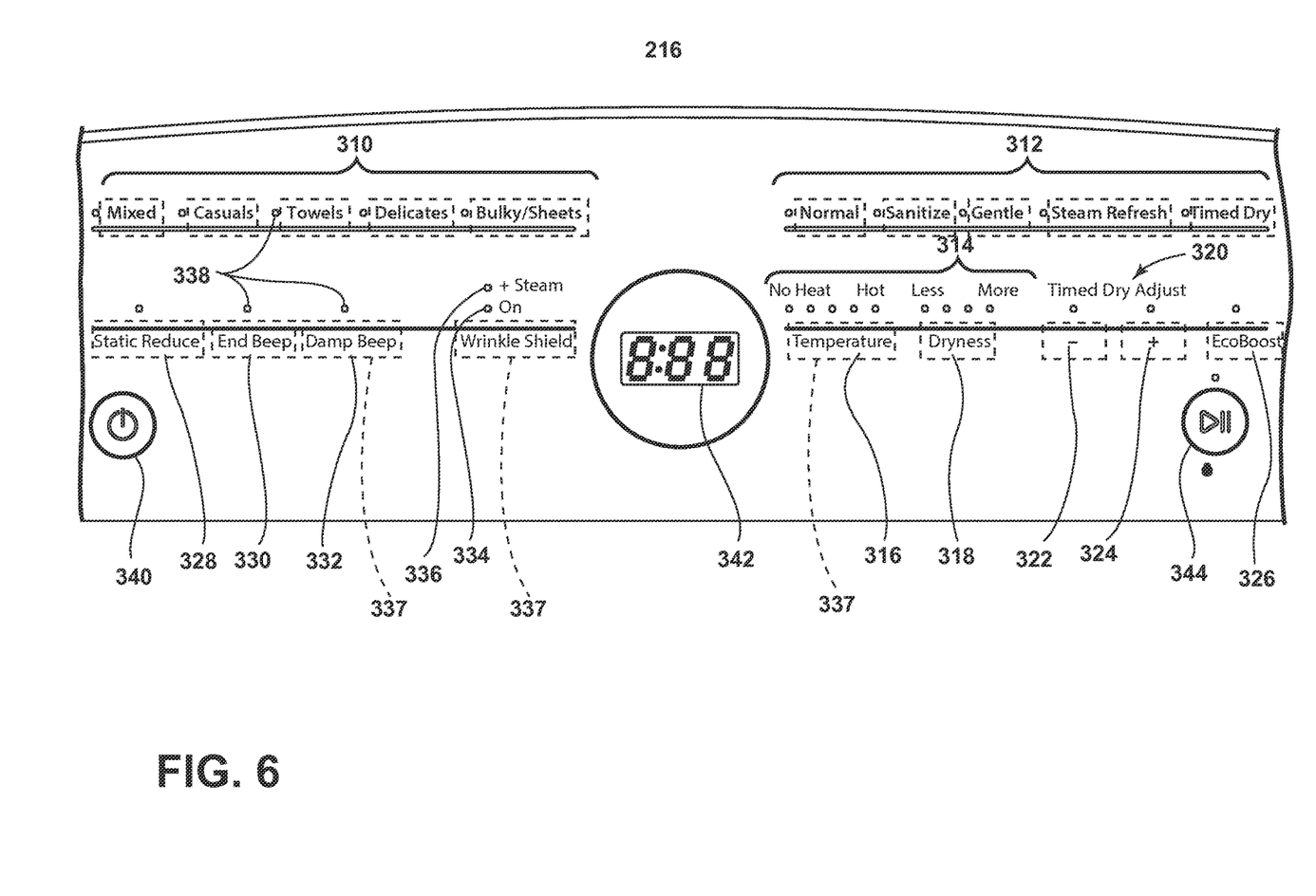
FIG. 6 is a front view of an exemplary user interface that can be included in the household appliance of FIG. 5.

An example of a user interface 216 that can be utilized in the dryer 210 is illustrated in FIG. 6. User-selectable options for laundry type are displayed at 310 and user-selectable options for treatment type are displayed at 312. Examples, without limitation, of laundry types 310 that can be displayed are mixed, casuals, towels, delicates, bulky/sheets, etc. Examples, without limitation, of treatment types 312 the can be displayed are normal, sanitize, gentle, steam refresh, timed dry, etc.

The treatment types 312 for each user-selectable laundry type 310 can include at least one user-selectable variable, which are displayed at 314. The user-selectable variables 314 have been illustrated as including, but are not limited to, temperature 316 and dryness 318. The options available for the temperature 316 can be a range including, but not limited to, from no heat to hot. The options available for the dryness 318 can be a range including, but not limited to, from less to more. A timed dry adjust 320 can also be included in the grouping of user-selectable variables 314 that can be preset according to what laundry type 310 and treatment type 312 are selected. For example, initially a preset time can be displayed on the visual display 342 based on the laundry type 310 and treatment type 312 selected and the minus or plus options 322 and 324 can be utilized to adjust the preset time.

Further still, options such as Eco Boost 326, static reduction 328, wrinkle shield 334, wrinkle shield with steam 336, etc. can be included on the user interface 216 as well as functions like end beep 330 and damp beep 332, which are user selectable but do not require a specific laundry type 310 and treatment type 312 to be utilized and thus are not considered user-selectable variables. The user-selectable laundry types 310, user-selectable treatment types 312, user-selectable variables 314, options, etc. can each be selected by depressing a switch or button 337 associated with that selection. The button 337 for each has been illustrated with phantom lines for clarity. Each of the user-selectable laundry types 310, user-selectable treatment types 312, user-selectable variables 314, options, etc. has also been illustrated as including an associated illumination source 338, that can be illuminated when the corresponding user-selectable laundry type 310, user-selectable treatment type 312, user-selectable variable 314, option, etc. has been selected, is available, is not available, etc. For the user-selectable variables 314, which have multiple levels associated with each button 337 depressing the corresponding buttons 337 can enable a user to scroll through the available levels and select a preferred level.

The user interface 216 can also include operational inputs including, but not limited to, a power button 340, start/pause button 344, etc. These related operational inputs can be used to effect the progress of the cycle of operation. Further still, a visual display 342 can be included to convey information to the user. While the visual display 142 has been illustrated as an alpha-numeric display it can be any type of visual display including an LED, LCD, OLED, type display, etc. Any or all of these features can be marked with appropriate indicia to indicate their function. While the user-selectable options for laundry type 310 and treatment type 312, user-selectable variables 314, options, etc. have been illustrated on the user interface 216 as being fixed it is contemplated that they can alternatively be dynamically displayed on the visual display 142 or another display having corresponding selectable buttons.

Selecting the cycle of operation or treating cycle can require a user to manipulate several of these features including at least a user-selectable laundry type 310, user-selectable treatment type 312, and user-selectable variable 314 to initiate operation and specify parameters of the treating cycle. In this manner it will be understood that the previously described dryer 210 can be used to implement the method 200 for displaying treating cycle selection information on a display of the user interface 216 is illustrated.

The method 2002 begins at 202 by displaying on the user interface 216 user-selectable options for laundry type 310 and treatment type 312 this can include displaying the laundry types 310 and treatment types 312 on a dynamic display or illuminating the associated illumination sources 338 to indicate to a user that the laundry types 310 and treatment types 312 are selectable. By way of non-limiting example, initially each of the laundry types 310 and treatment types 312 can be displayed or indicated as selectable by the illumination of the illumination sources 338 in one of several illumination states. A user-selectable laundry type 310 or treatment type 312 that is available and not selected can be illuminated in a first illumination state, which can be a first color such as amber. Once a user has selected the desired laundry type 310 or treatment type 312, the corresponding illumination sources 338 for the laundry type 310 or treatment type 312 that is selected can be illuminated in a second illumination state, which can be a second color such as green. Once a user has selected the desired laundry type 310 or treatment type 312, the unselected laundry types 310 or treatment types 312 can be illuminated in a third illumination state, which can be darkened or off state or a third color such as red. Further, before the laundry type 310 and treatment type 312 are selected, the user-selectable variables 314, options, etc. can also be in a darkened or off state.

In response to receiving user selections for the laundry type 310 and treatment type 312, the dryer 210 at 204 can display on the user interface 216 a group of user-selectable presets for the user-selectable variables 314. The presets can be displayed in a manner that indicates they are selected, for example they can be illuminated in the second illumination state, which can be a second color such as green. The user-selectable variables 314 that are not preset but are available can be illuminated in the first illumination state, which can be a first color such as amber. User-selectable variables 314 that are unavailable for the selected laundry type 310 and treatment type 312 can be illuminated in a third illumination state, which can be darkened or a third color such as red.

To accept the user-selectable presets the user can merely press the start button 344. It will be understood that pressing the start button 344 is considered a user selection from the group of user-selectable variables 314. Alternatively, the user can modify the user-selectable presets by utilizing the associated button 337 or alternative input sources. In response to receiving at least one user selection from the group of user-selectable presets, the dryer 210 at 206 can execute the treating cycle according to the user-selected laundry type 310, treatment type 312, and variable 314. In this manner, it will be understood that the terms "treating cycle" or "cycle of operation" encompass the laundry type, treatment type, and variables 314.

More specifically, once the controller 214 receives the laundry type and treatment type the controller 214 can determine one or more user-selectable variables 314, that can be implemented or that are optimal or recommended for the combination of the laundry type and treatment type. The controller 214 can have a table of user-selectable variables 314 that can be selected for the various combinations of laundry type 310 and treatment type 312 stored in its memory. The controller 214 can determine that only these user-selectable variables 314 are selectable based on the selected combinations of laundry type and treatment type. Once it is determined what variables 314 are appropriate, the controller 214 can correspondingly activate the user interface 216 accordingly.

It will be understood that the method 200 of displaying treating cycle selection information on a display of the dryer 210 is flexible and the method 200 illustrated is merely for illustrative purposes. For example, the sequence of steps depicted is for illustrative purposes only, and is not meant to limit the method 200 in any way, as it is understood that the steps can proceed in a different logical order or additional or intervening steps can be included without detracting from embodiments of the invention. By way of non-limiting example, the controller 214 in executing the treating cycle at 206 can take into account the laundry type 310 and treatment type 312 in determining how to execute the variable 314. For example, while a no heat to hot temperature range can be indicated on the user interface 216, the controller 214 for a specific laundry type 310 and treatment type 312 can take the user-selectable variable selection for the temperature 316 and limit it to a specific temperature range. For example, for a mixed laundry type 310 and a normal treatment type 312 the temperature, if the hot selection is selected for the temperature, can be at a higher temperature than if the hot selection for the temperature 316 is selected for a delicate laundry type 310 and a gentle treatment type 312. In this manner, although the user-selectable variable 314 can be the same (such as being at the hottest option) the treating cycle will have different temperatures because of the combination of the laundry type 310 and treatment type 312. Further, similar to the description above, it is contemplated that displaying the group of user-selectable presets can include displaying default settings or a combination of default settings and previously selected user-selections retained in a memory of the dryer 210. Some or all of which can then be modified, selected, or unselected by a user at 204.

The above described embodiments provide a variety of benefits including that the user interface provides the user with information regarding what variables are appropriate for the indicate treatment type and laundry type of the load that has been placed in the treating chamber. The above-described embodiments allow for the selection of more treating cycles by allowing users to select laundry types and treatment types as well as corresponding variables related thereto to form the treating cycle. In this manner, numerous treating cycles are available based on the total number of different combinations of the laundry type, treatment type, and corresponding variables. With each of the combinations of laundry type and treatment type, presets for variables can be provided to the user. Such presets can be optimal settings set by default out of the factory. Any customization of the preset settings can also be remembered the next time customers use the laundry treating appliance.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure. By way of further non-limiting example, in an alternative laundry treating appliance the user-selectable options for laundry type could include at least two of: mixed, casuals, whites, delicates, bulky, or towels and user-selectable options for treatment type could include at least two of: normal, quick, cold, deep water, color saver, sanitize, gentle, heavy duty, timed dry. For example, such an alternative laundry treating appliance could include a combination washing machine/dryer. In such an appliance, the at least one variable for the laundry type and treatment type combination could include at least one of: temperature, soil level, spin speed, extra rinse, presoak, dryness, or more/less timed dry. The group of user-selectable presets for the temperature variable can include at least two of: no heat, cold, warm, or hot. The group of user-selectable presets for the soil level variable can include at least two of: light, medium, or heavy. The group of user-selectable presets for the spin speed variable can include at least two of: none, low, medium, or high.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a laundry treating appliance, the method comprising:
   displaying, on the display, user-selectable options for laundry type and user-selectable options for treatment type where the combination of a selected laundry type and a selected treatment type has at least one variable;
   receiving, via a controller, a single user selection for the laundry type and a singe user selection for the treatment type;
   in response to receiving the single user selection for the laundry type and the single user selection for the treatment type, automatically displaying, on the display, a group of user-selectable presets for the at least one variable indicating that the group of user-selectable presets for at least one variable are pre-selected;
   receiving, via the controller, at least one user selection from the group of user-selectable presets for the at least one variable and wherein the at least one user selection from the group of user-selectable presets is an acceptance of the group of user-selectable presets or a modification of the group of user-selectable presets;
   defining a specific treating cycle according to the single user-selected laundry type, the single user-selected treatment type, and the at least one user selection for at least one variable; and
   operating, via the controller, at least one of a dispensing system, a liquid supply system, a drive system, a heating system, or a drain system of the laundry treating appliance to implement the defined specific treating cycle.

2. The method of claim 1 wherein the user-selectable options for laundry type comprise at least two of: mixed, casuals, whites, delicates, bulky or towels.

3. The method of claim 1 wherein the user-selectable options for treatment type comprise at least two of: normal, quick, cold, deep water, color saver, sanitize, gentle, heavy duty, timed dry.

4. The method of claim 1 wherein the at least one variable comprises at least one of: a temperature variable, a soil level variable, a spin speed variable, an extra rinse variable, a presoak variable, or a dryness variable.

5. The method of claim 4 wherein the group of user-selectable presets for the temperature variable comprises at least two of: no heat, cold, warm, or hot.

6. The method of claim 4 wherein the group of user-selectable presets for the soil level variable comprises at least two of: light, medium, or heavy.

7. The method of claim 4 wherein the group of user-selectable presets for the spin speed variable comprises at least two of: none, low, medium, or high.

8. The method of claim 4 wherein the group of user-selectable presets for the dryness variable comprises less or more.

9. The method of claim 1 wherein the specific treating cycle is a laundry washing treating cycle and the laundry type comprises at least two of: mixed, casuals, whites, delicates, of bulky/sheets; and the treatment type comprises at least two of: normal, quick, cold, deep water, or color saver.

10. The method of claim 1 wherein the specific treating cycle is a laundry drying treating cycle and the laundry type comprises at least two of: mixed, casuals, towels, delicates, of bulky/sheets; and the treatment type comprises at least two of: normal, sanitize, gentle, heavy duty, or timed dry.

11. A method of operating a laundry treating appliance, the method comprising:
    displaying, on the display, user-selectable options for laundry type and user-selectable options for treatment type;
    receiving, via a controller, a single user selection for the laundry type and a single user selection for the treatment type;
    in response to receiving the user selection for the laundry type and the user selection for the treatment type, automatically displaying, on the display, a group of user-selectable presets for at least one variable indicating that the group of user-selectable presets for at least one variable are pore-selected;
    receiving, via the controller, at least one user selection from the group of user-selectable presets for at least one variable and wherein the at least one user selection from the group of user-selectable presets is an acceptance of the group of user-selectable presets or a modification of the group of user-selectable presets; and
    in response to receiving at least one user selection from the group of user-selectable presets, preforming a look up, in a memory of the laundry treating appliance, of a specific treating cycle based on the user-selected laundry type, user-selected treatment type, and the user-selected at least one variable; and
    operating via the controller, at least one of a dispensing system, liquid supply system, drive system, heating system, or drain system of the laundry treating appliance to implement the specific treating cycle.

12. The method of claim 11 wherein the user-selectable options for laundry type comprise at least two of: mixed, casuals, whites, delicates, bulky or towels.

13. The method of claim 11 wherein the user-selectable options for treatment type comprise at least two of: normal, quick, cold, deep water, color saver, sanitize, gentle, heavy duty, timed dry.

14. The method of claim 11 wherein the at least one variable comprises at least one of: a temperature variable, a soil level variable, a spin speed variable, an extra rinse variable, a presoak variable, or a dryness variable.

15. The method of claim 11 wherein the receiving at least one user selection from the group of user-selectable presets comprises receiving a user selection to start the treating cycle with the indicated group of user-selectable presets.

16. A method of operating a laundry treating appliance, the method comprising:
    displaying, on the display, user-selectable options for laundry type and treatment type, with the user-selectable options for laundry type comprising at least two of: mixed, casuals, whites, delicates, bulky or towels, and the user-selectable options for treatment type comprising at least two of: normal, quick, cold, deep water, color saver, sanitize, gentle, heavy duty, timed dry;
    receiving, via a controller, a single user-selected laundry type and a single user-selected treatment type;
    in response to receiving the single user-selected laundry type and the single user-selected treatment type, automatically displaying, on the display, a group of user-selectable presets for at least one variable, which is based on a combination of the user-selected laundry type and the user-selected treatment type, wherein the displaying indicates that the group of user-selectable presets for at least one variable are pre-selected and with the at least one variable comprising at least one of: a temperature variable, a soil level variable, a spin speed variable, an extra rinse variable, a presoak variable, or a dryness variable;

receiving, via the controller, at least one user selection from the group of user-selectable presets for the at least one variable and wherein the at least one user selection from the group of user-selectable presets is an acceptance of the group of user-selectable presets or a modification of the group of user-selectable presets;

in response to receiving the at least one user selection from the group of user-selectable presets, defining a treating cycle defined according to the single user-selected laundry type, the single user-selected treatment type, and at least one user selection from the group user-selected presets for the at least one variable; and operating, via the controller, at least one of a dispensing system, liquid supply system, drive system, heating system, or drain system of the laundry treating appliance to implement the defined treating cycle.

17. The method of claim 16 wherein the group of user-selectable presets for the temperature variable comprises at least two of: no heat, cold, warm, or hot.

18. The method of claim 17 wherein the group of user-selectable presets for the soil level variable comprises at least two of: light, medium, or heavy.

19. The method of claim 18 wherein the group of user-selectable presets for the spin speed variable comprises at least two of: none, low, medium, or high.

20. The method of claim 19 wherein the group of user-selectable presets for the dryness variable comprises at least two of: less or more.

* * * * *